United States Patent

[11] 3,575,109

| [72] | Inventor | Richard T. Wall |
| | | Westport, Conn. |
| [21] | Appl. No. | 732,947 |
| [22] | Filed | May 29, 1968 |
| [45] | Patented | Apr. 13, 1971 |
| [73] | Assignee | National Electrotype Co., Inc. |
| | | New York, N.Y. |

[54] SYNTHETIC RESIN PRINTING PLATE AND METHOD OF MAKING SAME
12 Claims, 4 Drawing Figs.

[52] U.S. Cl. .................................................... 101/401.1
[51] Int. Cl. .................................................... B41n 1/22
[50] Field of Search ........................................ 101/401.1--4

[56] References Cited
UNITED STATES PATENTS

| 3,124,068 | 3/1964 | Thomas | 101/401.1 |
| 3,145,654 | 8/1964 | Johnson et al. | 101/401.1 |
| 3,147,706 | 9/1964 | Antonio et al. | 101/401.1 |
| 3,217,642 | 11/1965 | Tompkins et al. | 101/401.1 |
| 3,221,654 | 12/1965 | Jernt | 101/401.1 |

Primary Examiner—Robert E. Bagwill
Attorney—Shenier and O'Connor

ABSTRACT: A molded synthetic resin printing plate and method of making the same in which a matrix of a thermosetting synthetic resin first is formed using as a die the engraving of the matter to be printed. Next, a plate of thermoplastic synthetic resin is formed in the matrix under the action of heat and pressure. Before stripping of the plate and while the plate is still in the matrix, the back of the plate is milled to provide a plate having a thickness suitable for use on existing rotary printing press saddles. After milling, the plate is stripped from the mold and is assembled in a hemicylindrical female mold member with a heated hemicylindrical male mold member and a wet blanket and the mold is clamped. After a short period of time the entire assembly is cooled, the mold is disassembled and the plate is removed. In this way there is produced a synthetic resin printing plate conforming to the shape of the printing press saddle and from which plate high fidelity reproductions of the original can be printed directly. Because the plate conforms to the curvature of the press saddle the tendency present in semiflexible flat plates to straighten is obviated. In this manner a hard surfaced, semiflexible plate can be attached to the printing press saddle conveniently and securely merely by using double-backed adhesive tape or spray glues.

Patented April 13, 1971

INVENTOR.
Richard T. Wall
BY
Shenier & O'Connor
ATTORNEYS

Patented April 13, 1971
3,575,109
2 Sheets-Sheet 2
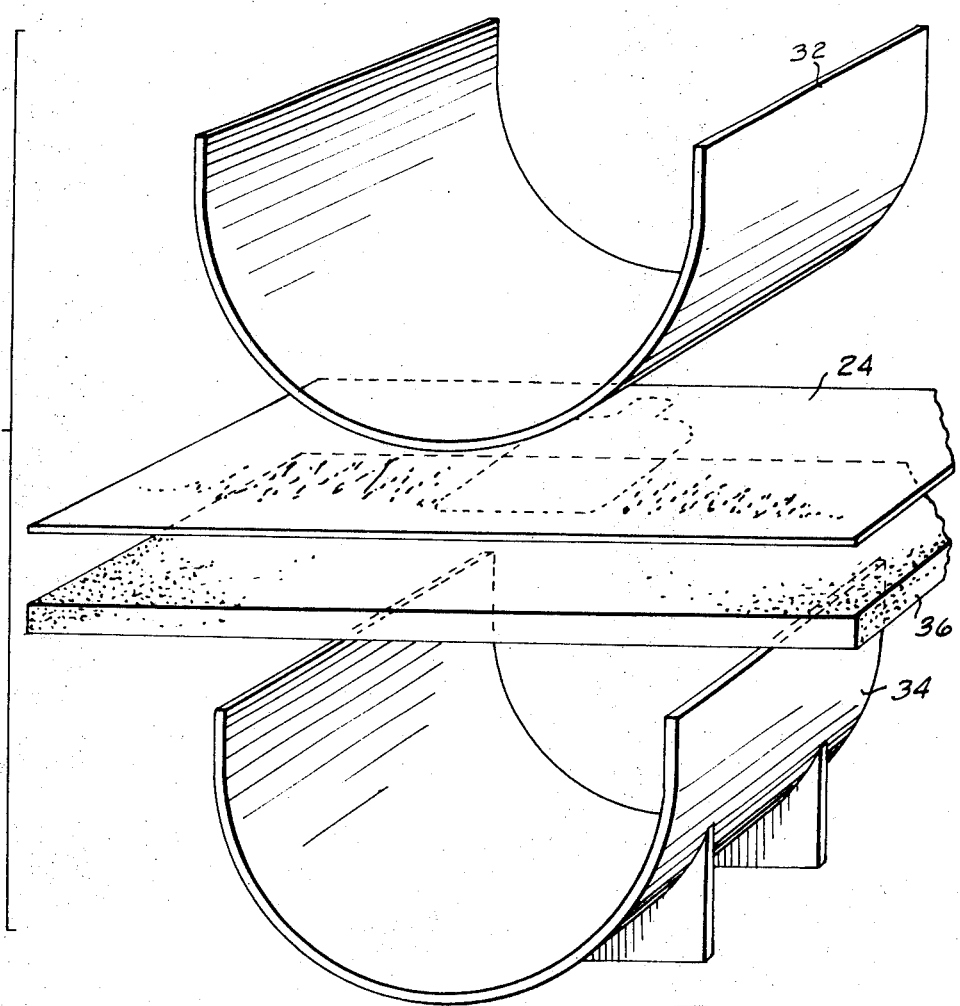
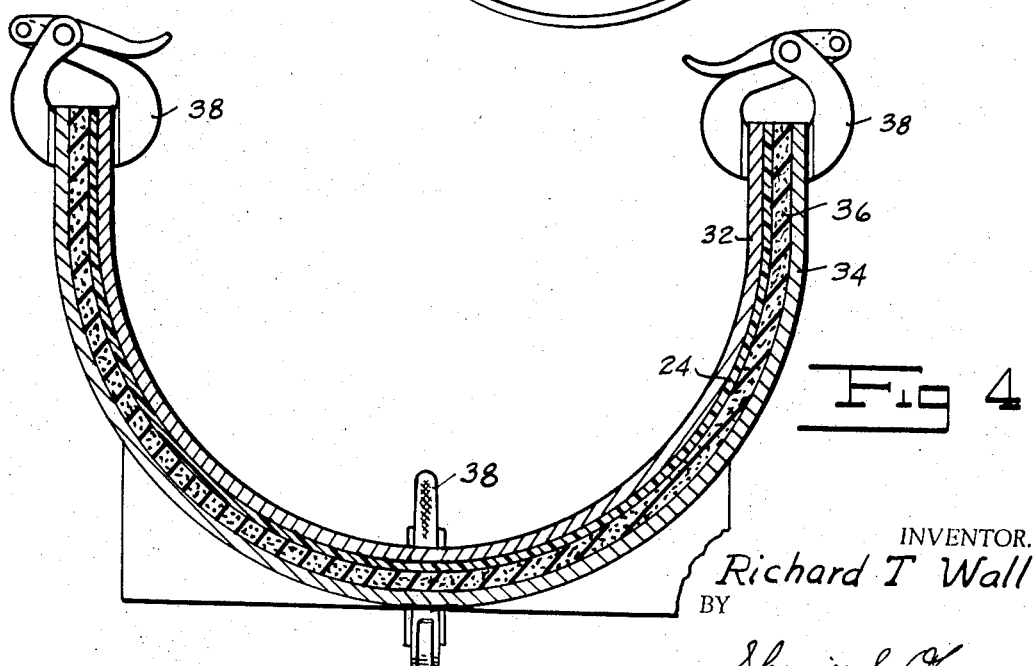
INVENTOR.
Richard T. Wall
BY
Shenier & O'Connor
ATTORNEYS

SYNTHETIC RESIN PRINTING PLATE AND METHOD OF MAKING SAME

BACKGROUND OF THE INVENTION

In printing illustrations such, for example, as those appearing in advertisements, the first step is preparation of an engraving of the illustration. If the illustration is to be in color, a plurality of engravings, corresponding to the number of different colored inks required, are made. If the illustration is to be run in only one publication, the engravings can be sent directly to the publishing establishment such, for example, as the newspaper printing plant. Upon receipt of the plates in order to permit the printing to be accomplished on a rotary press, a matrix is formed from wet paper and then dried. Using this matrix, the printer may cast a curved metal printing plate which can be attached to the cylinder of the press. Alternatively, if a better quality reproduction is desired, the printer may photoengrave or etch a thin flat zinc plate which can be bent in a bending machine to the shape of the saddle carried by the cylinder and may then be applied to the cylinder. Owing to the shrinkage in the process of making the paper matrix and of casting the metal, engravings in the prior art are made somewhat larger than the final reproduction.

More and more products are nationally advertised with the result that the same advertisement often runs concurrently in a large number of newspapers throughout the country. If the practice outlined above were followed for a four-color advertisement which is to appear concurrently in a number of publications, a complete set of engravings would of necessity have to be prepared for each publication. The expense of such a procedure is obvious. In an effort to overcome this problem, in the prior art it has been proposed that matrices of a suitable thermosetting resin first be prepared from the master engravings. Using the matrices there are next prepared a plurality of relatively thick plates of thermoplastic resin. A large number of such plates can be prepared at much less expense than is involved in preparing a corresponding number of engravings.

These flat resin plates are sent to the many publications in the same manner as are engravings to a single publication where an advertisement is to run in only a single publication. The practice from that point on is substantially the same as the practice followed using engravings. That is, using the plastic plate as a mold, a matrix of paper first is formed and then dried. Using the paper matrix the printer will either cast a curved lead plate for attachment to the printing cylinder or reproduce by photoengraving or etching a flat zinc plate which can be attached to the printing cylinder by use of a saddle.

It will readily be appreciated by those of ordinary skill in the art that saddles in use in the industry require only a very thin zinc plate. Printing from curved zinc engravings mounted on saddles produces better quality printing than do lead castings made from paper matrices.

I have invented a foamed synthetic resin printing plate which can be attached directly to the curved saddle of a printing press cylinder. It does away with the need for forming a paper matrix and metal casting at the printing plant. My synthetic resin printing plate faithfully maintains all the fine detail contained in the original engraving. My process produces a thin curved plastic plate with such minimum shrinkage that it can be used for four-color process reproduction. I have invented a method of making a synthetic resin printing plate which can be applied directly to the saddle of a printing press cylinder.

SUMMARY OF THE INVENTION

One object of my invention is to provide a synthetic resin printing plate which can be applied directly to the saddle of a rotary printing press.

Another object of my invention is to provide a method of making a synthetic resin printing plate which can be attached directly to the saddle of a rotary printing press cylinder.

A further object of my invention is to provide a synthetic resin printing plate which obviates the necessity for forming a paper matrix and metal casting as is done in the prior art.

A still further object of my invention is to provide a method of making a synthetic resin printing plate which faithfully maintains the fine detail of the original engraving and presents minor shrinkage parallel to the axis of curvature and no shrinkage along the curved surface owing to compensation. This enables simultaneous use of my plate and zinc photoengravings used in the newspaper industry.

Other and further objects of my invention will appear from the following description.

In general my invention contemplates a method of making a molded synthetic resin printing plate for attachment directly to the saddle of a rotary press cylinder in which I first form a matrix of a suitable thermosetting synthetic resin using a master engraving as a die. I next mold the printing plate in the matrix using a suitable thermoplastic synthetic resin. While the plate is still in the matrix, I mill the back of the plate to provide a printing plate of such thickness as can be used on an already existing printing press saddle. Milling in the matrix achieves three important features. First, the highlight dots are not spread or distorted. Secondly, the relief area or nonprinting areas routed in the original engraving die are maintained, and thirdly, the "make ready" which is the lowering or recessing of all highlight areas (small dots) in the printing surface is preserved. After milling, I strip the plate from the matrix and place a wet (which may be dry) blanket, the plate, printing side down, and a heated hemicylindrical male mold member in superposed relationship in a hemicylindrical female mold member and clamp the assembly. I permit the assembly to stand until the plastic plate is heated sufficiently to cause it when cooled to retain the shape of the mold members. I then cool the entire assembly, release the clamps and remove the plate. The resultant hemicylindrical thin printing plate is shipped to the publishing plant and the printer may apply it directly to the saddle of a rotary press cylinder, thus eliminating the necessity of forming a paper matrix and then casting a lead plate or etching a zinc engraving prior to printing.

BRIEF DESCRIPTION OF THE DRAWINGS

In the accompany drawings which form part of the instant specification and which are to be read in conjunction therewith and in which like reference numerals are used to indicate like parts in the various views:

FIG. 3 is a perspective view illustrating the apparatus employed in one of the final steps in my method of making a synthetic resin printing plate.

FIG. 4 is a sectional view of my synthetic resin printing plate in the mold for shaping the plate.

DESCRIPTION OF THE PREFERRED EMBODIMENT

Figure 1:
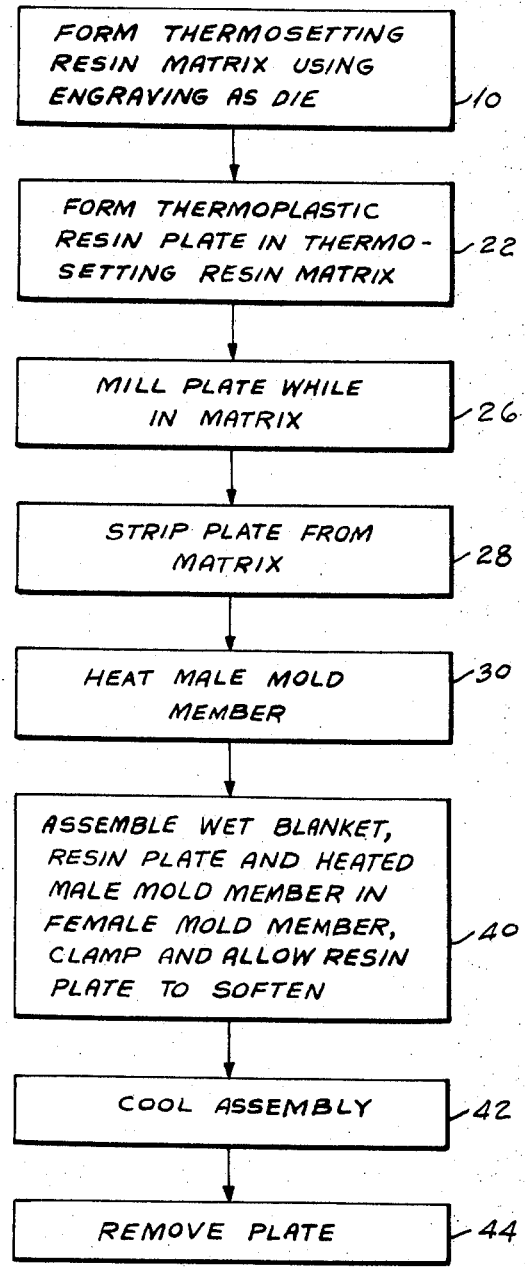
FIG. 1 is a block diagram illustrating the steps employed in the practice of a preferred form of my method of making a synthetic resin printing plate.
Figure 2:
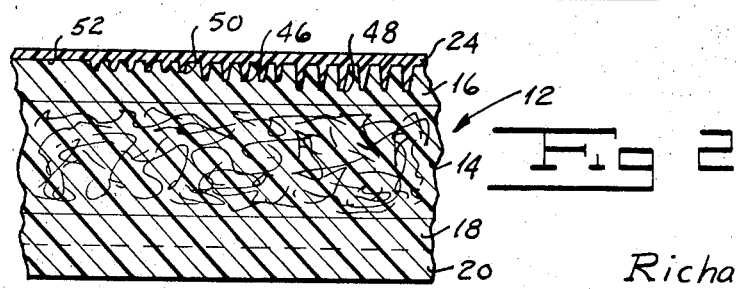
FIG. 2 is a fragmentary sectional view of my synthetic resin printing plate when in the matrix.

Referring now to the drawings, the first step in the practice of the preferred form of my method, indicated by the block 10 in FIG. 1, using the master engraving as a mold I first form a matrix, indicated generally by the reference character 12 in FIG. 2, from a suitable thermosetting resin under the action of heat and pressure. As is known in the art, thermosetting resins solidify or set upon heating and cannot be remolded. That is, they cannot be reshaped once they have been fully cured. Examples of thermosetting resins are phenolic resins and urea resins. A particular material which I have found to be suitable for use in making the matrix is a board having a fiber reinforced central body 14 with a single coat 16 of pure resin on one side thereof and two coats 18 and 20 of pure resin on the other side thereof. The reason for my preference for using a board having a single coat 16 on one side and two coats 18 and 20 on the other side will be explained more fully hereinafter.

After having formed the matrix 12, I next form the plate 24 from a suitable thermoplastic resin. This may be achieved either by using resin in sheet form or in the form of granules. As is known in the art, thermoplastic resins are those which may be softened by heat and upon cooling regain their original properties. Polystyrene resin, acrylic resin and vinyl resin are examples of some thermoplastic resins. In a particular example of the practice of my method, I first assemble the thermosetting resin matrix and the sheet or granules, or a combination of a sheet and granules, of polyvinylchloride between platens and heat the assembly for 3 or 4 minutes without applying pressure thereto. Then the heated assembly is placed in a water-cooled press and is subjected to a pressure of about 600 p.s.i. for 2 to 3 minutes. Flanges on the press, as is known in the art, limit the movement of the press ram toward the bed to regulate the thickness of the finished product.

After formation of the plate 24, the maximum thickness thereof is from about 0.080 to 0.100 inch. The standard rotary printing press saddles now in use in the industry require a plate having a maximum thickness of 0.065 inch with a relief of from 0.045 to 0.050 inch. The next step in my process of making a synthetic resin printing plate is milling the plate while in the matrix. I have discovered that by milling the plate before removing it from the matrix I can maintain the "make-ready" of the original engraving. By "make-ready" is meant the emphasis of certain regions of the representation and the deemphasis of others. That is to say, certain of the dot-forming projections 46 of the plate are considered of normal height. In other areas there are provided relatively higher dot-forming projections 48 which represent dark areas of the printed matter. In still other areas where highlights are desired, the dots are made lower than normal, as indicated by the dots 50 which extend only a short distance above the nonprinting area 52 of the plate 24. This operation of maintaining proper depth is of especial importance in newspaper printing owing to the soft backing and soft paper used in that industry.

In the course of performing the milling operation, the matrix 12 carrying the plate 24 is placed in a suitable milling machine of any type known to the art and is held in position therein by a vacuum applied to the underside of the matrix in the course of milling. The board making up the matrix 12 has some tendency to warp in the course of the operation of molding the plate. If a board were used having only one coating on each side thereof, after formation of the plate in the course of milling, with a vacuum applied to the underside of the matrix, the assembly has a tendency to dish and the result is that the milling operation is uneven so that the edges of the representation produced by the plate are undesirably deemphasized.

I have discovered that the particular form of board described hereinabove is eminently suitable for use in my method. That is, with two coats 18 and 20 of pure plastic on one side of the body 14 and with a single coat 16 on the other side, after formation of the plate 24 there is a slight tendency of the assembly to bulge upwardly in the center of the plate 24. However, when I place the assembly on the bed of the milling machine and apply the vacuum thereto, this tendency is almost entirely compensated so that the assembly is very nearly perfectly flat during the milling operation. Consequently, the thickness of the plate is closely controlled over its entire area during the milling operation.

After milling in the manner described above, I next strip the plate 24 from the matrix 12, as indicated by the block 28 in FIG. 1. The next step, indicated by the block 30, in the practice of my process is heating a male mold member. In the particular apparatus with which I now practice my method, I use a male mold member 32 formed of quarter-inch thick aluminum. The mandrel 32 is substantially the same shape as is the saddle of the printing press with which my plate is to be used. To heat the mandrel 32, I place it in an oven at a temperature of from about 350° to 400° F. for a period of from about 5 to about 7 minutes.

After heating the male mold member, I next assemble a cooling element such, for example, as a wet foam rubber pad or blanket 36 in a generally hemicylindrical female mold member 34, place the plate 24 over the blanket, insert the male mold member 32 in the assembly and clamp the parts together by use of a suitable number of toggle clamps 38. When that has been done, as is indicated by the block 40 in FIG. 1, I permit the assembly to stand for a period of time sufficient to permit the thermoplastic material of the plate 24 to soften. With the apparatus which I employ to practice my method, I have discovered that about 2½ to 3 minutes is a sufficient period of time. When that time has elapsed, I cool the entire assembly by any suitable means such, for example, as by immersing it in a tank of water. When the assembly is cooled, I release the clamps 38 and remove the finished plate 24.

This thermoplastic plate has a shape which conforms to that of a rotary printing press saddle. It is, moreover, so made that the "make-ready" of the original engraving is preserved and most accurate reproductions can be produced. I have discovered also that, owing to the fact that my method does not involve the shrinkage which occurs in making paper matrices and metal castings of the prior art, the engraving may be substantially the same size as the matter to be produced. My plate has negligible shrinkage, no rippling and no distortion. It provides a color register of various colors for making up a color advertisement or the like even though there may be different levels in the plates which are used for different colors.

It will readily be appreciated that the parameters, such as time and temperature, set forth for certain steps of my method are in some degree determined by the particular apparatus which I employ in practicing the steps. Where other particular means are employed, these parameters will vary. For example, a male mold member of a material different from aluminum might be used. Moreover, other means than the oven described might be employed to heat the member 32.

In summary, in practicing my method of making a synthetic resin printing plate which can be applied directly to the saddle of a rotary printing press cylinder, I first form a matrix of thermosetting synthetic resin such, for example, as a phenolic resin. Using this matrix as a mold, I then heat it together with either sheet or granulated thermoplastic resinous material and then place the heated assembly in a mold to form the plate 24 of thermoplastic synthetic resin. Next, before stripping the plate, I place it together with the matrix in a milling press wherein the assembly is held by a vacuum. Owing to the construction of the plate from which I form the matrix, it will lie substantially flat when in the milling machine wherein I mill the plate to a maximum thickness of about 0.065 inch, which is suitable for use of the plate in connection with presently existing rotary printing press saddles. I next strip the plate from the mold, heat the male mold member 32 and assemble a wet blanket 36, the plate 24, printing side down, and the heated male mold member 32 in the female mold member 34. After about 2½ to 3 minutes, I cool the entire assembly and, following cooling, remove the assembly and the finished plate.

It will be seen that I have accomplished the objects of my invention. I have provided a synthetic resin plate which may readily be assembled on the saddle of a rotary printing press, thus doing away with the necessity for forming a paper matrix and then a metal casting from the paper matrix as is done in the prior art. My method ensures that the plate will have the proper thickness for use on the saddle. It maintains the "make-ready" of the original engraving. My plate has no distortion or ripple and provides an excellent reproduction of material carried by the engraved plate.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

I claim:

1. A method of making a thin synthetic resin printing plate for attachment to the curved saddle of a rotary printing press including the steps of forming a matrix of thermosetting synthetic resin from an engraving of the matter to be printed, forming a plate of thermoplastic synthetic resin in said matrix, the assembly of said plate and said matrix having a generally uniform thickness over the area thereof between the back of the plate and the back of the matrix, milling the back of said plate while in said matrix to reduce the thickness of said plate, then stripping said plate from said matrix and shaping said stripped plate to the curvature of said saddle by molding.

2. A method as in claim 1 in which said step of forming said matrix comprises molding said matrix from said thermosetting synthetic resin.

3. A method as in claim 1 in which said step of forming said plate in said matrix comprises molding said plate from said thermoplastic synthetic resin.

4. A method as in claim 1 in which said step of forming said matrix comprises molding said matrix of said thermosetting synthetic resin on said engraving, and in which said step of forming said plate in said matrix comprises molding said plate of said thermoplastic synthetic resin in said matrix.

5. A method as in claim 1 in which said shaping step comprises heating a generally hemicylindrical male mold member, placing a springy backing material in a generally hemicylindrical female mold member, assembling said plate and said male mold member in said female mold member and clamping said mold members together.

6. A method as in claim 1 in which said step of forming said matrix comprises the step of molding said matrix from said thermosetting synthetic resin on said engraving and in which said step of forming said plate in said matrix comprises the step of molding said plate from said thermoplastic synthetic resin in said matrix and in which said shaping step comprises heating a generally hemicylindrical male mold member, placing a wet blanket in a generally hemicylindrical female mold member, and assembling said plate and said male mold member in said female mold member.

7. A method as in claim 1 in which said shaping step includes constraining said plate to a generally hemicylindrical condition and heating said plate while in said condition.

8. A method as in claim 1 in which said shaping step includes heating one side of said plate while inhibiting heating of the other side thereof.

9. A method as in claim 1 in which said shaping step includes placing said plate in a generally hemispherical mold, heating one side of said plate and inhibiting heating of the other side of said plate while in said mold.

10. A method as in claim 1 in which said shaping step includes the steps of heating a generally hemispherical mold member, inhibiting heating of a generally hemispherical female mold member, and positioning said plate between said mold members.

11. A method as in claim 1 in which said shaping step includes heating a generally hemispherical mold member, inhibiting heating of a generally hemispherical female mold member and assembling said plate between said mold members and cooling said assembly.

12. A method as in claim 1 in which said shaping step comprises heating one side of said plate while inhibiting heating of the other side thereof.